United States Patent
Ackerman et al.

(10) Patent No.: US 6,884,515 B2
(45) Date of Patent: Apr. 26, 2005

(54) AFTERBURNER SEALS WITH HEAT REJECTION COATS

(75) Inventors: John Frederick Ackerman, Laramie, WY (US); Paul Arszman, Cincinnati, OH (US); Andrew J. Skoog, Wester Chester, OH (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 10/324,550

(22) Filed: Dec. 20, 2002

(65) Prior Publication Data

US 2004/0214025 A1 Oct. 28, 2004

(51) Int. Cl.$^7$ ............................. B32B 15/04; F03B 3/12
(52) U.S. Cl. .................... 428/469; 428/697; 428/699; 428/701; 428/702; 428/472.2; 416/241 R
(58) Field of Search .............................. 428/469, 472.1, 428/472.2, 697, 699, 701, 702; 416/241 R, 241 B

(56) References Cited

U.S. PATENT DOCUMENTS

| | | |
|---|---|---|
| 2,927,043 A | 3/1960 | Stetson |
| 3,345,197 A | 10/1967 | Martini et al. |
| 3,415,672 A | 12/1968 | Levinstein et al. |
| 3,676,085 A | 7/1972 | Evans et al. |
| 3,819,338 A | 6/1974 | Bungardt et al. |
| 3,961,910 A | 6/1976 | Baladjanian et al. |
| 3,978,251 A | 8/1976 | Stetson et al. |
| 4,070,507 A | 1/1978 | Stueber et al. |
| 4,101,714 A | 7/1978 | Rairden, III |
| 4,101,715 A | 7/1978 | Rairden, III |
| 4,142,023 A | 2/1979 | Bornstein et al. |
| 4,145,481 A | 3/1979 | Gupta et al. |
| 4,374,183 A | 2/1983 | Deadmore et al. |
| 4,382,976 A | 5/1983 | Restall |
| 31,339 A | 8/1983 | Dardi et al. |
| 4,656,099 A | 4/1987 | Sievers |
| 5,302,465 A | 4/1994 | Miller et al. |
| 5,427,866 A | * 6/1995 | Nagaraj et al. |
| 5,464,699 A | 11/1995 | Baldi |
| 5,512,382 A | * 4/1996 | Strangman |
| 5,562,998 A | 10/1996 | Strangman |
| 5,624,721 A | 4/1997 | Strangman |
| 5,824,423 A | 10/1998 | Maxwell et al. |
| 5,876,860 A | 3/1999 | Marijnissen et al. |
| 5,981,091 A | 11/1999 | Rickerby et al. |
| 6,103,386 A | 8/2000 | Raybould et al. |
| 6,146,696 A | 11/2000 | Das et al. |
| 6,207,233 B1 | 3/2001 | Perry et al. |
| 6,253,441 B1 | 7/2001 | Wheat et al. |

FOREIGN PATENT DOCUMENTS

JP 11-29380 * 2/1999

* cited by examiner

*Primary Examiner*—Jennifer McNeil
(74) *Attorney, Agent, or Firm*—McNees Wallace & Nurick LLC

(57) ABSTRACT

A method for applying a coating system that is applied to a surface of a component for preventing or at least substantially preventing interdiffusion between the component surface and a protective thermal layer applied to the component surface when the thermal layer is exposed to elevated temperatures. The method includes applying a carrier layer containing aluminum to the component surface. Next, the layer is heated to a first predetermined temperature for a first predetermined period of time in the substantial absence of oxygen to bond the aluminum with the component surface, the heat dissolving the carrier portion of the aluminum layer. The remaining portion of the aluminum layer is then heated to a second predetermined temperature for a second predetermined period of time to form an oxidized aluminum layer. Finally, at least one protective thermal layer is applied over the oxidized aluminum layer.

2 Claims, 2 Drawing Sheets

AFTERBURNER SEALS WITH HEAT REJECTION COATS

CROSS-REFERENCE TO RELATED APPLICATIONS

This Application is related to application Ser. No. 10/324,704, filed contemporaneously with this Application on Dec. 20, 2002, entitled "COMBUSTION LINER WITH HEAT REJECTION COATS" assigned to the assignee of the present invention and which is incorporated herein by reference, and to application Ser. No. 10/325,000, filed contemporaneously with this Application on Dec. 20, 2002, entitled "TURBINE NOZZLE WITH HEAT REJECTION COATS" assigned to the assignee of the present invention and which is incorporated herein by reference.

FIELD OF THE INVENTION

Thus there is a need in the art for an inexpensive, lightweight means to prevent interdiffusion between component surfaces and heat rejection coatings. The present invention relates generally to heat rejection coats applied to component surfaces exposed to high temperatures and more particularly to providing a diffusion barrier sub-coating prior to applying the heat rejection coats to the component surfaces to stabilize and preserve the heat rejection coats.

BACKGROUND OF THE INVENTION

Components exposed to elevated temperatures and mechanical stresses, such as aircraft engines which typically employ nickel, iron or cobalt based superalloys, require protective coatings from corrosion and from the high operating temperatures to achieve reliable operation for extended periods of time. More specifically, component surfaces having metallic heat rejection coatings, such as platinum, gold or rhodium which may be sandwiched between a pair of stabilizing layers, such as tantalum, that are exposed to radiative flames exhibit both measurable temperature decrease and increased service life compared to uncoated component surfaces. These heat rejection coatings achieve this temperature decrease by effectively reflecting the radiative energy away from the component surface. Accordingly, it is highly desirable to apply these heat rejection coatings to similarly exposed surfaces. However, this is not possible for certain metal alloy parts, such as afterburner seals, which may be regularly exposed to temperatures exceeding about 788° C. (1450° F.). At this temperature range, the heat rejection coating interdiffuses with the underlying component surface, or substrate. In essence, a portion of the heat rejection coating material migrates into the component substrate material. This interdiffusion causes the reflective heat rejection surface to become a radiation absorber, losing or at least substantially losing its ability to reflect radiative energy, resulting in a reduction of its ability to decrease component surface temperature, thereby decreasing the service life of the component. Therefore, a means to prevent the interdiffusion between component surfaces and the heat rejection coatings is highly desired.

One method to prevent this interdiffuision is the provision of a barrier coating applied between the component surface and the heat rejection surface. A variety of these barrier coatings are known in the art and include paint-on dielectric oxides, chemical vapor deposited oxides and baked-on rare earth oxides. However, none of these barrier coating constructions may be utilized in this application because they either are inefficient in preventing diffusion or lose their adhesive properties at higher temperatures.

Alternately, it has been shown that nozzles may be covered with a thick macroscopic coating of a ceramic thermal barrier coating, referred as TBC, which is also known as "smooth coat," commonly employing a TBC composition referred as "(AJ11)." U.S. Pat. Nos. 5,624,721 and 5,824,423 are directed to methods which employ aluminum bond coat layers for securing TBC coatings. While heat rejection coatings have been shown to remain intact when applied over these TBC coatings, the thick TBC coatings are expensive to manufacture and apply and are extremely heavy, effectively limiting their application to aerospace components.

Thus there is a need in the art for an inexpensive, lightweight means to prevent interdiffusion between component surfaces and heat rejection coatings.

SUMMARY OF THE INVENTION

The present invention is directed to a method for applying a coating system that is applied to a surface of a component for preventing or at least substantially preventing interdiffusion between the component surface and a protective thermal layer applied to the component surface when the surface is exposed to elevated temperatures. The method includes first applying an aluminum-based material to the component surface. In addition to aluminum, this material may include a carrier material and a binder, both of which are typically organic when the material is a paint. Next, the layer is heated to a first predetermined temperature for a first predetermined period of time in the substantial absence of oxygen to metallurgically bond the aluminum with the component surface, the heat volatizing the carrier and binder portion of the aluminum layer. The remaining portion of the aluminum layer is then heated to a second predetermined temperature for a second predetermined period of time in the presence of oxygen to form an oxidized aluminum layer alumina. Finally, at least one protective thermal layer is applied over the alumina.

The aluminum layer can be applied by standard commercially available aluminide processes whereby aluminum is reacted at the substrate surface of the component to form an aluminum or aluminum-containing composition which provides a reservoir for the growth of the aluminum oxidation layer. This aluminum layer is typically and predominantly aluminum, but may also be combined with other metals, including nickel, cobalt and iron as well as aluminum phases of nickel, cobalt and iron, or may be formed by contacting an aluminum vapor species or aluminum rich alloy powder with the component substrate and depositing the aluminum on the substrate surface. This layer is typically metallurgically bonded to the substrate and may be accomplished by numerous techniques, including a pack cementation process, over-the pack processing, spraying, chemical vapor deposition, electrophoresis, sputtering, vapor phase aluminiding and slurry sintering with an aluminum rich vapor and appropriate diffusion heat treatments. Aluminum will form highly stable refractory oxide layers at the operating temperature of hot section components which are tightly adherent and cohesive and thus effective to block incursions of corrosive chemical agents into the component substrate, so long as the aluminum oxide layer remains intact while preventing the migration of substrate elements outward. When a coating is applied over the alumina, it prevents the coating elements from migrating inward or the substrate elements from migrating outward. In other words, the oxide layer will act as a barrier to prevent interdiffusion of elements across it.

A primary advantage of the present invention is an inexpensive, lightweight means to prevent interdiffusion between the substrate and heat rejection coatings applied over the substrate surfaces exposed to elevated temperatures.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
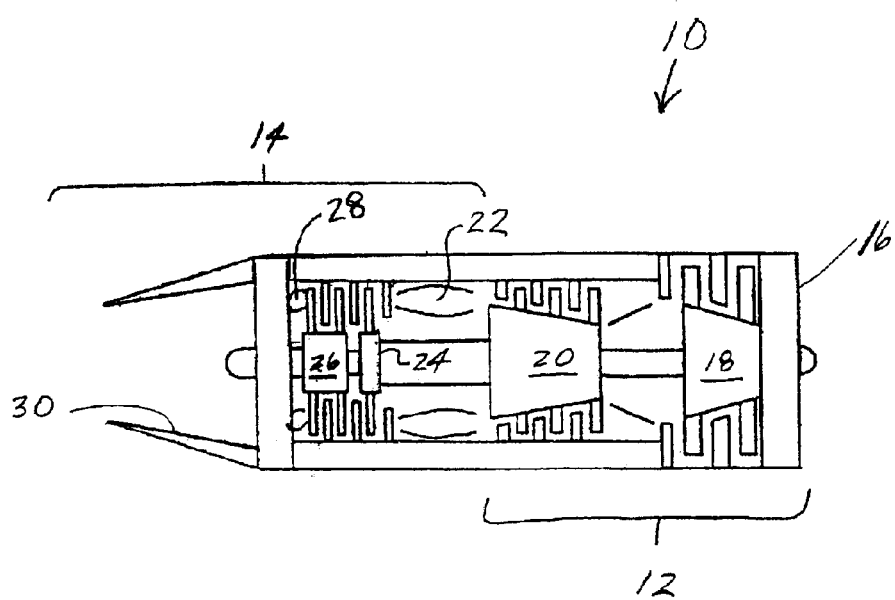
FIG. 1 is a schematic cross sectional view of a jet engine depicting component regions having surfaces suitable for employment of the method for applying a coating system of the present invention.

Referring now to FIG. 1, a jet engine 10 is provided having a hot section 14 which advantageously utilizes the coating system and method of application of the present invention. Engine 10 includes in serial flow relation proceeding in a direction from an inlet 16 to exhaust nozzle 30, through a low pressure compressor 18, a high pressure compressor 20, a combustor 22, a high pressure turbine 24, a low pressure turbine 26, an afterburner 28, and terminating in exhaust nozzle 30. Afterburners 28 are optional items used in military applications. Air entering inlet 16 is compressed by compressors 18, 20 before reaching combustor 22 where the highly compressed air is mixed with fuel and ignited. This air/fuel exhaust mixture is then propelled through turbines 24, 26 which are urged into rotation by the passing mixture of hot gases to likewise rotatably drive respective compressors 18, 20, since these components are connected to a common drive shaft. Upon reaching optional afterburner 28, fuel is introduced into the mixture stream to augment thrust, utilizing the unburned oxygen in the exhaust gas to support combustion. Afterburners are typically used in military aircraft. They increase the speed of the aircraft for short periods of time, by injecting fuel into the hot exhaust gas stream where it is combusted, thereby providing additional thrust. The temperature of the afterburner flame can exceed about 1,700° C. (about 3,100° F.), so the burners of afterburner 28 are directed radially inward so that at least a portion of the mixture from turbines 24, 26 flow past the wall of this region, helping maintain wall temperatures at somewhat reduced temperature levels. The resultant increased temperature of the exhaust gas increases its velocity as it leaves exhaust nozzle 30, providing increased engine thrust.

Afterburner 28 components, such as the seals, are nonetheless subjected to significant radiative heat from afterburner flames despite the burner orientations and will greatly benefit from the present invention.

Figure 2:
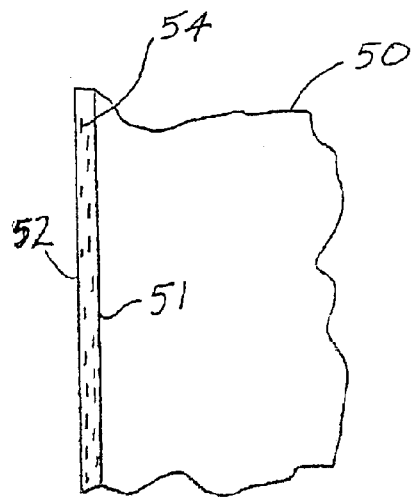
FIG. 2 is an enlarged partial cross sectional view taken from FIG. 1 of the afterburner region after a paint coating containing aluminum has been applied.

Referring to FIG. 2, a sub coating layer 52 which is a carrier layer containing aluminum applied over the substrate 50 shall now be discussed. In the preferred embodiment, sub coating layer 52 is formed from application of commercially available spray paint, such as Krylon® No. 1404, manufactured by Sherwin-Williams Company, although comparable paints from other manufacturers could likely also be used. It is realized that any of the conventional methods to form this aluminum layer previously discussed could also be employed. Carrier material contained within the layer permits sub coating layer 52 to be sprayed over a substrate surface 51 of a substrate 50, such as an afterburner seal. Sub coating layer 52 may be applied to substrate surface 51 of substrate 50 in a manner substantially similar to that employed to apply a coat of paint to an article sufficient to "cover" the article. In other words, by applying one, preferably two, coats of paint from a commercially available spray can to surface 51, sub coating layer 52 contains an amount of aluminum particles 54 sufficient to ultimately form an aluminum oxide layer 56 (FIGS. 4, 5) on surface 51 as will be discussed in greater detail below.

Further referring to FIG. 2, which is a partial cross-sectional view of a coated afterburner 28 seal, aluminum particles 54 carried within sub coating layer 52 are suspended within binder materials (not shown) in the paint formulation which bind the layer to the seal surface and prevent aluminum particles 54 from combining with oxygen to form aluminum oxide. These binder materials will be removed, i.e., vaporized, by a first thermal treatment step that will be further discussed below and is not otherwise addressed herein. Aluminum particles 54 preferably have a platelike morphology that will be substantially oriented parallel to surface 51. More preferably, aluminum particles 54 are about ½ micron in thickness and are substantially equally distributed within sub coating layer 52. These particles preferably have an aspect ratio of between about 100:1 to about 10:1, 20:1 being the most preferred. Particle aspect ratios exceeding this upper range are difficult to apply by spraying, and ratios below this lower range have decreased "coverability."

In preparation for this first heating step, substrate 50 is placed in an environment, such as a substantially fluid-tight oven or heating chamber, having an extremely low oxygen partial pressure, or having a substantial absence of oxygen. This may also be accomplished by an environment filled with inert gases, such as argon, helium, or even hydrogen or nitrogen, although a vacuum of sufficient magnitude may be employed. Once substrate 50 has been placed in the desired environment or the conditions of the desired environment have been achieved, substrate 50 and sub coating layer 52 are subjected to a first heat treatment. During the first heat treatment, the environment temperature reached and maintained for the duration of the first heat treatment may range from about 600° C. (1,100° F.) to about 1,000° C. (1,830° F.). One having skill in the art realizes that the duration of the first heat treatment varies depending upon the temperature selected, since the rate of diffusion of aluminum is exponentially affected by temperature, for example, substrate 50 will typically require about fifty hours of exposure at about 600° C. (1,100° F.), or about one hour of exposure at about 1,000° C. (1,830° F.) to achieve substantially the same results, i.e., same depth of diffusion. Therefore, any number of heat/exposure combinations may be employed as a matter of manufacturing convenience, so long as the results achieved substantially mirror the results of the 600°

Figure 3:
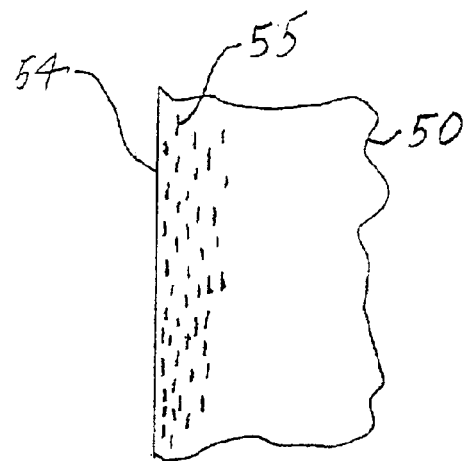
FIG. 3 is the enlarged partial cross sectional view of FIG. 2 of aluminum diffusing into the substrate by application of heat in the substantial absence of oxygen.

C./1,000° C. (1,110–1,830° F.) exposures just described. Once this first heat treatment has been completed, referring to FIG. 3, a significant amount of diffused aluminum 55 is diffused into substrate 50, forming an alloy with the inter-diffused substrate.

Figure 4:
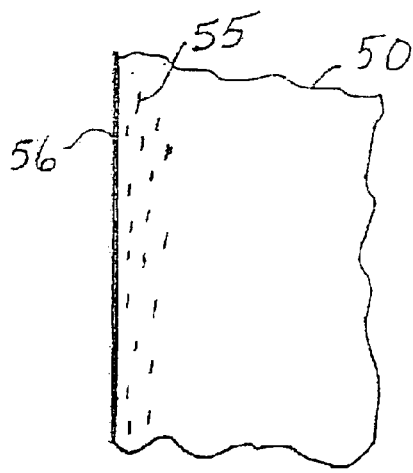
FIG. 4 is the enlarged partial cross sectional view of FIG. 3 of formation of an aluminum oxide layer forming from migration of the diffused aluminum from within the substrate by the application of heat in the presence of oxygen.

Referring to FIG. 4, after the first heat treatment has been completed, substrate 50 is subjected to a second heat treatment. In essence, termperature/exposure of the second heat treatment is substantially similar to that previously described for the first heat treatment. However, the major difference between the two heat treatments is that the second heat treatment is performed in the presence of oxygen. This oxygen exposure promotes the formation of an aluminum oxide layer 56 along the surface of substrate 50. Aluminum 54 remaining on the surface oxidizes and a portion of the diffused aluminum 55 that had previously diffused into substrate 50 during the first heat treatment migrate to the substrate surface so as to form a continuous tightly adherent aluminum oxide layer. Preferably, aluminum oxide layer 56 is from about one to about ten microns thick, although this layer may permissibly be up to about ten mils (0.010 inches) in thickness.

Figure 5:
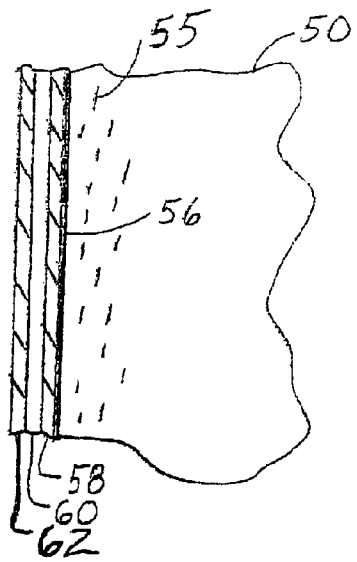
FIG. 5 is the enlarged partial cross sectional view of FIG. 4 after application of a heat rejection coating over the aluminum oxide layer.

Referring to FIG. 5, after aluminum oxide layer 56 has been formed, a smooth protective thermal coating may be applied. This coating may be chemical vapor deposited via a reagent of tantalum ethoxide, which flows into the environmental chamber containing substrate 50. It is critical that the protective thermal layer be smooth to controllably reflect radiative energy away from substrate 50 and into the gas stream. Otherwise, the radiative energy may be scattered or reflected toward unintended regions of the engine, with adverse results. Upon contacting substrate 50, the tantalum ethoxide deposits a tantalum oxide layer 58 and ethanol by-products. Similarly, a platinum oxide layer 60 is formed by chemical vapor deposition which is then followed by application of a second tantalum oxide layer 62 that is applied over platinum oxide layer 60. The sandwiching tantalum oxide layers 58, 62 add stability to platinum oxide layer 60, especially at higher temperatures. The ethanol by-products, being volatile, are readily removed. Other noble metal layers that may be applied, in addition to platinum and tantalum, include palladium and rhodium. Other protective layers that may be applied in addition to tantalum oxide are titanium oxide, silicon oxide, zirconium oxide, haffiium oxide, aluminum oxide, chromium oxide and mixtures thereof.

Successful exposure testing of coupons, typically lengths of material approximately one inch in diameter, have been conducted. Such testing typically consists of exposing the coupon to a heat-up period from ambient to a first desired temperature level, requiring a time interval, such as about twenty minutes, holding the coupon at the first desired temperature level for another time interval, such as about forty minutes, before cooling-down the part in a manner similar to the heating-up period, and repeating these heat-up cool-down cycles to/from the first temperature for a predetermined number of times, typically several hundred. If the coupon survives the first temperature, the temperature is raised by some increment, typically several hundred degrees, and similarly cycled until the coupon coating spalls. The present invention has exceeded about 1,000° C. (1800° F.) which is typically the upper temperature range of temperature an afterburner seal will see in service.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A superalloy afterburner seal having high temperature capability comprising:

an additive layer of alumina applied to an exposed surface of the superalloy seal; and a noble metal layer applied over the alumina providing a highly reflective layer, the seal further characterized by a substantial absence of a subsequent ceramic layer.

2. The afterburner seal of claim 1, wherein the noble metal layer is selected from a group consisting of platinum, palladium and rhodium.

* * * * *